United States Patent Office 3,436,383
Patented Apr. 1, 1969

3,436,383
POLYMERIZATION PROCESS
Stephen O'Brien, William Henry Janes, Keith Andrew Taylor, and Peter Frank Todd, Runcorn, England, assignors to Imperial Chemical Industries Limited, Millbank, London, England, a corporation of Great Britain
No Drawing. Filed May 25, 1966, Ser. No. 552,685
Claims priority, application Great Britain, June 1, 1965, 23,357/65
Int. Cl. C08f 1/30; C07f 11/00
U.S. Cl. 260—88.7     11 Claims

ABSTRACT OF THE DISCLOSURE

A process for polymerization of substituted alkenes by contacting the alkene with an organo-metallic compound of a metal of Groups IV–A to VI–A, which contains at least one π-allylic ligand, and isolating the polymer produced.

---

This invention relates to the oligomerization or polymerization of substituted alkenes.

According to the present invention, we provide a process for the oligomerization or polymerization of substituted alkenes, which comprises contacting a monomer with an organometallic compound of a metal of Groups IV–A to VI–A of the Periodic Table of the Elements, which contains at least one π-allylic ligand.

By the term "substituted alkene" we mean a mono- or poly-ethylenically unsaturated compound containing a substituent in place of at least one of the hydrogen atoms of the molecule.

By the Periodic Table of the Elements, we mean the Long Periodic Table as shown inside the back cover of "General and Inorganic Chemistry" by Partington, published by Macmillan, 2nd edition.

The term "π-allylic ligand" as used herein, is defined as a ligand comprising an allylic group of the general formula

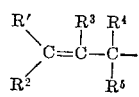

I bonded to the metal atom in a manner which may be represented by the structure

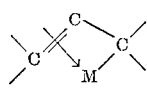

II where M represents a metal of Group IV–A to VI–A of the Periodic Table. In Formula I, R′ to R⁵, which may be the same or different, may be, for example, hydrogen atoms, halogen atoms and monovalent radicals, e.g. —NO₂, —CN, —SH, —OH, —R and —OR where R represents a monovalent hydrocarbon radical e.g. alkyl, aryl, aralkyl, alkaryl or alkenyl (where alkyl includes cycloalkyl) or a substituted (e.g. halogenated) derivative thereof. Alternatively, two or more of the free valencies satisfied by R′–R⁵ may be linked together by a divalent organic radical, for example a polymethylene or alkylidene group.

The precise manner in which the allylic groups are bonded to the metal atom (M) is the subject of discussion but without limiting this invention it may be said that in the π-allyl compounds the allyl radical may be regarded as the contributor of three electrons to the metal-allyl bond. In contrast, in the σ-allyl complexes, such as σ-allyl manganese pentacarbonyl, the allyl radical contributes only one electron to the metal-allyl bond to give a conventional carbon-metal electron-pair linkage.

The π-allylic structures and their derivatives may be detected by such techniques as nuclear magnetic resonance or infra-red spectroscopy. For example, the π-allylic structure is recognised by a multiplet with intensity one and two doublets each with intensity two using nuclear magnetic resonance techniques.

Although π-allylic bonding has been represented for the purpose of this specification by the structure II, it may of course also be represented by the tautomeric form III below. Possibly, it would be more correct to represent the bonding by resonant structure IV, since it has been shown that in some cases the carbon to metal bonds are equivalent.

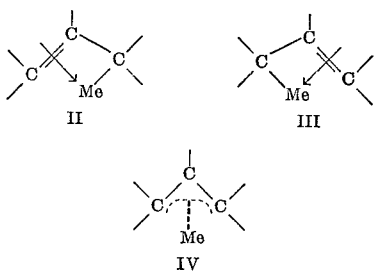

The organo-metallic compounds useful in our invention may contain only π-allylic ligands or other ligands may also be present as desired and these may be anionic, cationic or neutral and mono- or poly-dentate in character; for example, they may be selected from ligands such as halogen, carboxylate, phenolate, thiophenolate, CN⁻, organic phosphines, CO, NO, olefins and ligands derived from β-dicarbonyl organic compounds, for example acetylacetone, 3-cyanoacetyl acetone, esters of α-ketocarboxylic acids and esters of malonic acid or cyanomalonic acid. Examples of such compounds are tris(π-allyl) chromium, tris(π-methallyl)chromium, tris(π-crotyl)chromium, titanium(π-methallyl), dimolybdenum tetra(π-allyl), bis(π-allyl) (acetylacetonato)chromium.

The π-allylic compounds may be prepared by a number of techniques which are well described in published literature and may be, for example, as follows (1) By reacting a metal halide or complexed metal halide with an allyl Grignard reagent, usually in ether solution at low temperatures;

(2) By reacting a halogeno hydrido, alkyl or aryl metal derivative with a diene or triene, generally butadiene or a substituted derivative thereof or cycloheptatriene;

(3) By hydrogen abstraction, e.g. by reacting PdCl₂ with cyclohexene at 50–100° C. to yield

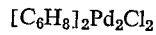

[C₆H₈]₂Pd₂Cl₂

(4) By reduction of a dienyl complex (e.g. by reducing a cyclopentadienyl complex to

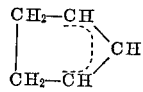

using sodium amalgam or a carbon monoxide/hydrogen mixture);

(5) By reacting single or substituted metal carbonyls with allyl halides;

(6) By reacting anionic metal complexes (e.g. Co[CO]₄⁻)

with allyl halides and (7) By reacting a metal carbonyl with a cyclic diene (e.g. cyclopentadiene) to obtain a

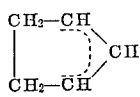

complex.

It will be appreciated that no single process is necessarily applicable to the production of the whole range of π-allylic compounds. However, most π-allylic compounds will be capable of being produced by suitable choice of any one of the above processes or modifications thereof.

The activity and selectivity of our specified organo-metallic compounds in initiating the oligomerization or polymerization of our specified ethylenically unsaturated monomers depend upon the choice of metal atom, the substituents on the π-allylic ligan or ligands and the nature of other ligands attached to the metal atom, if any. All these variables contribute towards the utility and specificity of each organo-metallic compound. Thus, it should be understood that many members of our group of organo-metallic compounds may not be capable of initiating the oligomerization or polymerization of all monomers within our specified class and that by modification of one or more of the variables in any member, its efficiency in polymerizing and/or oligomerizing any monomer or group of monomers will be varied.

Monomers that may be oligomerized or polymerized according to our invention include aralkenes, alkenyl carboxylic acids, their esters and nitriles, alkenyl carboxylates, alkenyl halides and alkenyl ethers. The monomers may contain multi-ethylenic unsaturation, if desired, and mixtures of our monomers alone or together with alkenes such as ethylene, propylene, butene-1 and butadiene may be treated according to our invention. Examples of monomers are methyl methacrylate, chloroprene and acrylonitrile.

The addition of alkyls of, for example, Zn and Al as co-catalyst has an activating effect on many of our organo-metallic compounds.

The process of the invention is effected by contacting the monomer or mixture of monomers with the specified organo-metallic compound. The monomer is preferably used in liquid form and therefore if it is not a liquid under the treatment conditions it is preferred to dissolve it in a suitable solvent. Examples of suitable solvents are aliphatic or aromatic hydrocarbons and esters; for instance pentane, hexane, heptane, octane, benzene, toluene, ethylacetate and mixtures thereof. Some solvents may act as chain transfer agents.

The other conditions for the polymerization reaction, such as temperature and pressure, depend to some extent upon the choice of monomer and of organo-metallic compound. Atmospheric pressure is generally satisfactory although higher or lower pressures may be used, if desired, for example between 1 and 50 atmospheres. The temperature conveniently lies between −30° C. and 100° C.

The process is preferably effected under an atmosphere free of oxygen, for example under an atmosphere of an inert gas, e.g. nitrogen, or of the monomer to be polymerized, because many of our specified organo-metallic compounds are very sensitive to oxygen. It is also preferred to effect the process under substantially anhydrous conditions in vessels that have been carefully dried before use and using dry solvents.

Many of our specified organo-metallic compounds tend to be thermally unstable and therefore it is preferred to store them at low temperatures, generally below 0° C., before use. Preferably, however, these compounds are prepared immediately prior to use thereby obviating the problems entailed by low temperature storage. Alternatively, the compounds may be formed in situ in the presence of the monomer to be polymerized.

Concentrations of the compounds in the reaction mixture should lie between 1 and 60 mmoles/liter and preferably between 5 and 30 mmoles/liter.

The invention is illustrated by but not limited to the following examples in which all parts are expressed by weight.

Example 1

Tris(π-allyl)chromium was prepared as follows. Anhydrous chromium trichloride in ether was added to allyl magnesium chloride under argon over a period of 1 hour and at −30° C. The mixture was stirred for several hours under argon at −80° C. and filtered and the ether was removed at −20° C. under reduced pressure. Pentane was then added and the product filtered under argon. It was identified by mass spectrometry.

A reaction vessel was purged of atmospheric oxygen by flushing with nitrogen and then charged with 31.3 parts of dry heptane followed by 18.8 parts of methyl methacrylate, which had just been distilled over calcium hydride at reduced pressure and under a nitrogen atmosphere, and brought to 0° C. A solution of 0.2 part of the above π-allyl chromium complex in 6.3 parts of pentane which had been cooled to −40° C. was then introduced into the vessel and the temperature raised to 40° C. After three hours, about 0.6 part of poly(methyl methacrylate) was recovered by precipitation into acidified methanol. The polymer was found to have a molecular weight of $1 \times 10^5$ and examination of its nuclear magnetic resonance spectrum showed it to be 20% isotactic, 35% heterotactic and 45% syndiotactic. By way of comparison, it is noted that poly(methyl methacrylate) produced by free radical initiation processes is 5% isotactic, 35% heterotactic and 62% syndiotactic.

A dummy polymerization run under identical conditions but in the absence of the metal complex yielded no polymer.

Example 2

The polymerization process of Example 1 was repeated using 44 parts of benzene as the solvent. Poly(methyl methacrylate) was obtained in similar yields and with similar properties.

A dummy polymerization run under identical conditions but in the absence of the metal complex yielded no polymer.

Example 3

The polymerization process of Example 1 was repeated using 56.4 parts of monomer and no solvent. Poly(methyl methacrylate) was obtained in similar yields and with similar properties.

A dummy polymerization run under identical conditions but in the absence of the metal complex yielded no polymer.

Example 4

The polymerization process of Example 1 was repeated in the presence of aluminium triethyl in an amount equal to twice the molar amount of metal complex present. The polymer yield was doubled and the product was of high molecular weight.

Example 5

The polymerization process of Example 2 was repeated but with 47.7 parts of chloroprene in place of the methyl methacrylate. The polymerization was effected at 50° C. for 4 hours, at the end of which time 5 parts of poly(chloroprene) were isolated. This represented a conversion of 5.2%.

A dummy polymerization run under identical conditions but in the absence of the metal complex yielded no polymer.

Example 6

Dimolybdenum tetra(π-allyl) was prepared under argon by pouring a solution of $MoCl_5$ in ether into a solution of allyl magnesium chloride in the same solvent. The mixture was stirred at room temperature for 24 hours and then all the ether was removed under vacuum. The remaining solid was extracted with pentane and the undissolved residuum was filtered off leaving a green solution in pentane of the molybdenum π-allyl complex. This was kept under argon.

The polymerization process of Example 2 was repeated using as the initiator a solution of 0.2 part of the above molybdenum π-allyl complex in 6.3 parts of pentane. After reaction at 40° C. for 4 hours, poly(methyl methacrylate) was isolated.

Example 7

The polymerization process of Example 1 was repeated using 43 parts of benzene with 16 parts of acrylonitrile and 0.2 part of tris(π-allyl)chromium. The reaction mixture was heated to 25° C. and polymerization commenced instantaneously. After 3 hours 4.4 parts of poly(acrylonitrile) were isolated. This represents a conversion of 28%.

Example 8

The polymerization process of Example 1 was repeated using 80 parts of toluene with 4.03 parts of acrylonitrile and 0.1 part of tris(π-allyl)chromium. The reaction was conducted at 0° C. for 2 hours at the end of which time 0.65 part of poly(acrylonitrile) was isolated. This represents a conversion of 16%.

Example 9

Tetrakis(π-methallyl)titanium was prepared as follows. Methallyl magnesium chloride in ether was added slowly over one hour to a stirred suspension of anhydrous titanium tetrachloride in ether under an atmosphere of dry nitrogen. The temperature was maintained at −80° C. and stirred overnight. It was then filtered at −60° C. and the solvent removed at −45° C. and 0.05 mm. Hg pressure. A brown oily residue containing tetrakis(π-methallyl)titanium was extracted with pentane and the resultant solution filtered at −60° C. The solution was stored at −80° C. until used.

45 parts of toluene, 18.8 parts of methyl methacrylate and 0.27 part of tetrakis(π-methallyl)titanium in pentane solution were mixed at −60° C. and allowed to warm to room temperature. The reaction mixture was heated to 45° C. for 2 hours at the end of which time 0.3 part of poly(methyl methacrylate) was isolated.

Example 10

Tris(π-methallyl)chromium was prepared by an analogous process to that described under Example 1, by substituting methallyl magnesium chloride for the allyl compound previously used.

The polymerization process of Example 1 was repeated using 33 parts of hexane, 18.8 parts of methyl methacrylate and 0.2 part of tris(π-methallyl) chromium. The reaction mixture was heated to 50° C. for 3 hours at the end of which time 2.0 parts of poly(methyl methacrylate) were isolated. This represents a conversion of 12%.

Example 11

The polymerization process of Example 10 was repeated with 16 parts of acrylonitrile instead of the methyl methacrylate previously used. The reaction was extremely violent and polymerization occurred immediately. 8.3 parts of poly(acrylonitrile) were isolated, representing a conversion of over 50%.

Example 12

Example 11 was repeated at 0° C. with 45 parts of toluene in place of hexane. 8.9 parts of poly(acrylonitrile) were isolated, representing a conversion of 55.4%.

Example 13

Tris(π-crotyl)chromium was prepared by an analogous process to that described under Example 1, by substituting crotyl magnesium chloride for the allyl compound previously used.

The polymerization process of Example 10 was repeated using the same monomer but 0.2 part of tris(π-crotyl) chromium as initiator and 45 parts of toluene as solvent. After 3 hours 0.4 part of poly(methyl methacrylate) was isolated.

Example 14

Using the general conditions of Example 1, 0.1 part of tris(π-allyl)chromium and 0.4 part of tris(acetylacetonate) chromium were mixed in 45 parts of toluene. 18.8 parts of methyl methacrylate were added at 50° C. and after 3 hours 1.2 parts of poly(methyl methacrylate) were isolated. This represents a conversion of 6.4%.

Without limiting the invention thereby it is thought probable that the initiating species in this polymerization was bis(π-allyl) (acetylacetonate) chromium formed by the following reaction:

$$2Cr(all)_3 + Cr(acac)_3 \rightarrow 3Cr(all)_2(acac)$$

where (all) = a π-allyl and (acac) = an acetylacetonate group.

We claim:
1. A process for the polymerization of a vinyl monomer containing nitrile groups which comprises contacting the nitrile with an organo-metallic compound of chromium which contains at least one π-allylic ligand and isolating the polymer.
2. A process according to claim 1 wherein the polymerization is carried out at a temperature of −30° to 100° C., a pressure of 1–50 atmospheres and a concentration of the π-allylic compound of 1 mM. to 60 mM. per liter.
3. A process according to claim 1 in which the said compound contains only π-allylic ligands.
4. A process according to claim 1 in which the allyl group of at least one of the π-allylic ligands contains at least one substituent other than hydrogen.
5. A process according to claim 4 in which the said allyl group is selected from methallyl and crotyl.
6. A process according to claim 1 in which acrylonitrile is polymerized using tris(π-methallyl)chromium as initiator.
7. A process according to claim 1 in which the polymerization is effected in the presence of a solvent.
8. A process according to claim 7 in which the solvent is selected from pentane, hexane, heptane, benzene, toluene and mixtures of at least two of said solvents.
9. A process according to claim 1 in which the concentration of π-allylic compound is between 5 moles and 30 moles/litre.
10. A process according to claim 1 in which the reaction is carried out at atmospheric pressure.
11. A process according to claim 1 in which the π-allylic compound is formed in situ in the presence of the monomer.

References Cited

UNITED STATES PATENTS 3,379,706    4/1968    Wilke 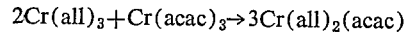 260—93.7

OTHER REFERENCES

Wilke, Chem. Abs., 61 (1964) p. 690 d.

HARRY WONG, JR., *Primary Examiner.*

U.S. Cl. X.R.

260—93.5, 80, 89.5, 91.1, 91.5, 88.1, 80.3, 86.1, 85.5, 87.5, 82.5, 88.2, 86.7, 84.1, 82.1